United States Patent [19]

Endo et al.

[11] 4,392,903

[45] Jul. 12, 1983

[54] PROCESS FOR MAKING A THERMAL-INSULATING NONWOVEN BULKY PRODUCT

[75] Inventors: Tadakazu Endo, Ohtsu; Hirotsugu Suzuki, Tokyo; Masanori Takahashi, Kyoto, all of Japan

[73] Assignee: Toray Industries, Inc., Tokyo, Japan

[21] Appl. No.: 305,377

[22] Filed: Sep. 25, 1981

Related U.S. Application Data

[62] Division of Ser. No. 146,078, May 2, 1980, Pat. No. 4,320,166.

[51] Int. Cl.[3] .......... B32B 3/28

[52] U.S. Cl. .......... 156/167; 19/299; 28/103; 28/254; 156/181; 264/518

[58] Field of Search .......... 156/167, 181; 264/518; 19/299; 28/254, 103

[56] References Cited

U.S. PATENT DOCUMENTS

| | | | |
|---|---|---|---|
| 3,169,899 | 2/1965 | Steuber | 19/299 |
| 3,798,100 | 3/1974 | Marchadier et al. | 156/181 |
| 3,802,980 | 4/1974 | Harmon | 28/103 |
| 3,837,022 | 9/1974 | Moore | 5/355 |
| 3,853,651 | 12/1974 | Porte | 156/167 |
| 3,905,057 | 9/1975 | Willis et al. | 5/337 |
| 3,906,130 | 9/1975 | Tsurumi et al. | 428/131 |
| 4,146,674 | 3/1979 | Salamon et al. | 428/361 |
| 4,172,174 | 10/1979 | Takagi | 428/288 |
| 4,217,387 | 8/1980 | Viezee et al. | 28/103 |

*Primary Examiner*—James J. Bell
*Attorney, Agent, or Firm*—Austin R. Miller

[57] ABSTRACT

A process for producing thermal-insulating nonwoven bulky product characterized by its structural make up of substantially continuous single filaments of from about 0.01 to 2 denier which are stabilized on themselves in the product by a surface binder on the filaments.

5 Claims, 2 Drawing Figures

PROCESS FOR MAKING A THERMAL-INSULATING NONWOVEN BULKY PRODUCT

This is a division of application Ser. No. 146,078, filed May 2, 1980 now U.S. Pat. No. 4,320,166.

BACKGROUND OF THE INVENTION

The present invention relates to fibrous nonwoven articles for stuffing, packing and the like, and more particularly, to lightweight, resilient and bulky materials which are suitable for thermal insulation, and are made up of substantially continuous single fine filaments stabilized on themselves by one or more surface binders.

Down and feathers are well known to have good properties as stuffing for articles such as for example, eiderdowns, sleeping bags, pillows, jackets and the like. However, they are very expensive because of their short supply, and require great care in order to avoid damage by insects and microbes. They also have inherent drawbacks, e.g., necessities of quilting to avoid uneven distribution in stuffed articles and of using expensive, closely woven or specially finished fabrics to avoid their penetration through the casing fabrics.

Natural or synthetic discontinuous, crimped fibers have also been used as stuffing in the form of wadding or laps. These fibers, however, are inferior to down and feathers for use as thermal insulation, rendering the stuffed articles unfavorably heavy in order to assure comparable thermal insulation. They also have the undesirable tendencies, during the course of time and over long use, of protruding through the enveloping material, agglomerating and losing the original bulkiness or disassociating because of their irreversible movement secured by crimp or surface scale.

It has been found that the addition of a bonding resin to bond the staple fibers at their cross-over points in wadding or in a lap produces improved support bulk and prevents the fibers from migrating. Therefore, it is today's commercial practice to cross-lap the webs and to spread a resin on the surface of the layered structure. It has also been recognized that too many bondings cause a loss in softness of the web.

There has been proposed stuffing material consisting of a highly corrugated web of continuous filaments which are directed substantially in the same direction and in which the undulations are fixed with the aid of an appropriate resin. The typical method of preparation of such webs consists in passing a tow of continuous filaments between two rollers driven at different peripheral velocities, taking up the corrugated web thus formed, spraying a bonding agent on the undulating lap and, finally, curing the bonding agent thus deposited. The stuffing materials formed in this manner retain the original alignment of filaments despite efforts to bring about a bulky form by corrugation. Also, the anisotropy sometimes exhibits an undesirable performance when in use, e.g., contraction toward the direction rectangular to the alignment of the filaments or breakage along the alignment, resulting in insufficient thermal insulating ability.

Although many proposals have been made for the provision of a stuffing material to solve the above-mentioned defects of staple fibers or tow and to simulate the desirable properties of down, such as for example, thermal-insulating ability and softness, the ideal stuffing material, equal or superior to natural down in these desirable properties, was not discovered prior to applicants' invention as disclosed and claimed in the present application.

It is, therefore, a primary object of the present invention to provide a thermal-insulating bulky product characterized by its structural make-up of substantially continuous, single fine filaments which are stabilized in the product by a surface binder on the filaments.

Another object of the present invention is to provide a thermal-insulating bulky product which may be uniquely accumulated, made of substantially continuous filaments which are stabilized in the product by a surface binder on the filaments.

Still another object of the present invention is to provide a new bulky product of a synthetic polymer which simulates down in its touch, in its response to compression, and in its thermal-insulating ability.

A further object of the present invention is to provide a bulky material made of substantially continuous filaments of a synthetic polymer which satisfies the requirements for stuffing and quilting goods.

Other objectss and advantages of the present invention shall become more apparent from the following detailed description, illustrative and comparative examples, and table, together with the accompanying drawings which illustrate the preferred process of the present invention.

DRAWINGS

DETAILED DESCRIPTION OF THE INVENTION

Figure 1:
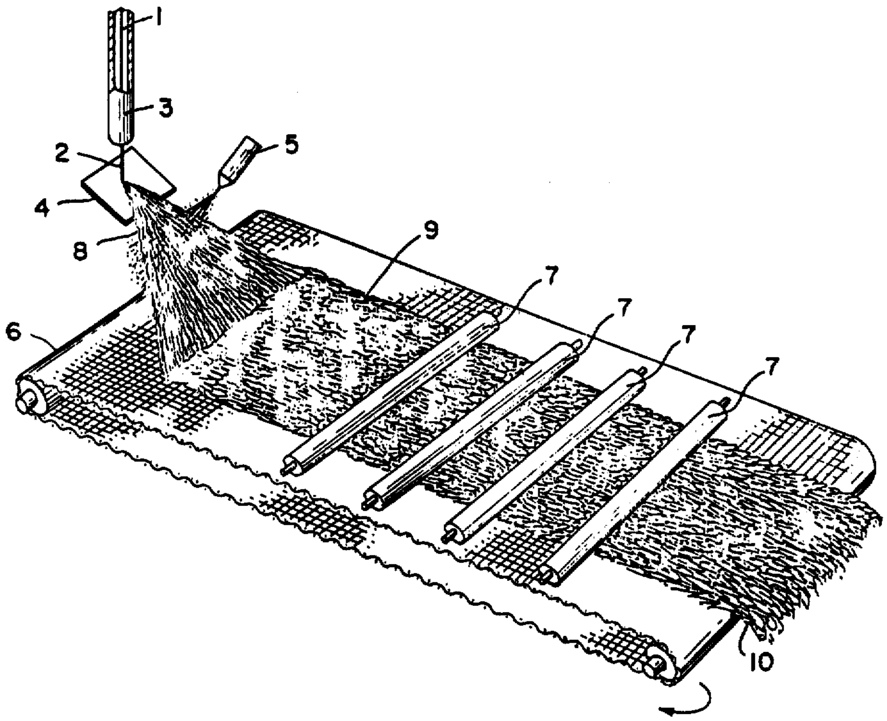
FIG. 1 is a schematic illustration of the preferred process by which the present accumulated product may be provided.

The thermal-insulating bulky product of the present invention is characterized by a structural make-up of substantially continuous, single fine filaments of from about 0.01 to about 2 deniers which are stabilized in the product by a surface binder on the filaments. The product of the present invention is preferably, though not necessarily, an accumulated layered product whose specific volume is not less than about 40 ml/g, and is preferably in the range of about 50 to about 500 ml/g.

It should be especially noted that the substantially continuous filament used in the present invention is usually a constituent of a multifilament and is incorporated in the bulky product as a single filament to provide as uniform a distribution as possible of the minute spaces which are produced by the neighboring single filaments. It is also important to provide a bulky accumulation of the single filaments. Compacted bundles of multifilaments and the interlaced ones should be minimized as far as possible in order to achieve a higher ability of heat insulation. When the bulkiness of the filament is too small, the wrong effect of the bundles of multifilaments, or interlaced ones, in the product, is drastically manifested.

Random crimping in each filament is beneficial in avoiding the above-mentioned unfavorable bundles in the accumulated product because the crimp makes it difficult for the filaments to stick together.

Regular crimping, which can be induced by false twisting or stuffer box, is not desirable because separation of the multifilaments into individual, single filaments becomes difficult and there is a possibility they still stick together in use, resulting in a reduction in bulkiness and in heat-insulating ability.

Interlacing or twisting in the multifilaments should also be avoided for the same reasons mentioned above.

Filaments in the bulky product of the present invention preferably have random crimps which are uneven in form and number of crimps between filaments. This contributes to bring about a stable quality in thermal insulation over a period of long use because unfavorable agglomeration and loss in bulkiness is considerably reduced.

The average percentage of crimp should not be too large in order to avoid unfavorable agglomeration of the filaments and it should not be too small in order to secure sufficient bulkiness in use. The average percentage of the crimp should be in the range of from about 1 to about 20%, and preferably from about 2 to about 10%.

The percentage of crimp of the filaments is defined by the following equation:

$$\text{percentage crimp (\%)} = \frac{l_1 - l_0}{l_1} \times 100$$

wherein $l_0$, is the distance betwen arbitrarily chosen points in the filaments measured under the load of 2 mg/d, and $l_1$ is the distance between the same points measured under the load of 300 mg/d.

The average fineness of the single filaments should be in the range of from about 0.01 to about 2 deniers, and preferably from about 0.1 to 1 denier. Each filament may be either uniform or have varying denier along its length. Mixing of no less than two kinds of deniers is sometimes desirable. In any case, a filament of too large a fineness should not be used because the thermal-insulating ability intended by this invention cannot be established, and the softness and/or drapability of the accumulated product becomes insufficient. On the other hand, a filament of too small a fineness should also be avoid because the intended stable, resilient bulkiness of the present invention cannot be brought about when the filaments are too fine.

For industrial production of the product of the present invention, it is obvious that multifilament should be used to provide the present accumulated product. In this case, the total fineness of the multifilament should not be less than about 10 deniers, and preferably is in the range of from about 30 to about 3000 deniers.

The synthetic polymers which make-up the filaments of the present invention may be any known fiber-forming polymer such as polyesters and polyamides. Preferably, polyethylene terephthalate and its copolymers which contain not less than about 85% of the repeating unit of ethylene terephthalate is used. The remaining repeating units which can be copolymerized are preferably butylene terephthalate, butylene isophthalate and ethylene isophthalate.

The filaments of the accumulated product of the present invention should have a binder on their surfaces which contributes to bind the filaments at their cross-over points in the accumulated product, to stabilize the bulkiness and to prevent the filaments from migrating. The binder utilized in the present invention should not be sticky at the final stage in the product; however, it is necessary for the binder to be sticky at the intermediate stage to bind the filaments at their cross-over points. Thermoplastic polymers having relatively lower melting or softening points than the filaments are suitable for this purpose. Polyvinylalcohol and polyacrylic esters are preferable. The binder should be deposited on the filaments as a mist of minute particles of emulsion before the accumulation of the filaments so that uniform distribution of the binder in the accumulated product may be established. The amount of the binder in the accumulated product should be in the range of from about 0.5 to about 20% based on the weight of the filaments, and preferably from about 2 to about 10%. The binder should not be used in an amount beyond the above-mentioned upper limit because the softness and/or drapability of the accumulated product will be considerably reduced and accordingly, the thermal insulating ability will also decrease. On the other hand, the binder should not be used in any amount below the lower limit mentioned above because the necessary number of cross-over points may fail to bind, resulting in a decrease in the stability of the bulkiness during long use.

The molecular weight of the binder should not be too large in order for stable and minute particles of mist to be obtained from a predetermined concentration of the binder in water. In the case of polyvinylalcohol, the average molecular weight should be in the range of from about 100 to about 10,000, preferably from about 200 to about 2000, and its extent of saponification should be not less than 98%.

The accumulated product of the present invention is also characterized by a large specific volume of not less than about 40 ml/g, and preferably from about 50 to about 500 ml/g when measured under the load of 0.125 g/cm$^2$. Such a high bulkiness is obtained by the accumulation on a suitable conveyer of filaments which already have the binder on their surfaces and heat setting the bulky form a suitable means as will be exemplified hereinafter. The accumulated product of the present invention can thus exhibit stability of bulkiness even under repeated compression and decompression or repeated shearing and relaxing.

"Specific volume" as used herein designates the bulkiness of the accumulated product and is defined by the following equation:

$$\text{Specific volume (ml/g)} = \frac{20 \times 20 \times h}{A}$$

wherein A is the weight of the sample having a length and width of 20 cm and 20 cm, respectively; h is the average height of the sample measured under the load of 0.125 g/cm$^2$.

The specific volume, as here defined, should be discriminated from the apparent specific volume, later referred to, this being obtained by simple calculation without the load above-mentioned.

The accumulating structure of the filaments in the accumulated product can be of any form insofar as bulkiness and drapability of the present invention are concerned. Preferably the filaments should be repeatedly folded at both surfaces of the accumulation, and remain in overlapping layers in a loose or relaxed state. The filaments may accumulate in either a horizontal or non-horizontal direction; however, when the filaments are obliquely laid in the accumulation with the length between the foldings at both surfaces being more than twice the height of the accumulation, the layered structure of the accumulated filaments thus obtained provides the accumulated product with high drapability together with stable bulkiness and is especially preferred.

The accumulated product of the present invention may be modified later on by the use of additional binders which may be either the same as the binder already used in the accumulation or a different binder. Especially, finishing the accumulation by surface treatment with binders is sometimes desirable in order for the product not to protrude through the casing fabrics.

The method of producing the bulky accumulation of single filaments of the present invention is not limited to the use of any specific apparatus, but reference is made to the preferred procedure illustrated in the drawings.

Referring to FIG. 1 of the drawings, multifilament 1, 2, ordinarily being one bundle of filaments, but may be more than one, which have been melt-spun by the conventional method gushes out through the nozzle 3 and impinges against plate 4 where the multifilaments are crimped and separated individually. The filaments 8 then undergo the deposition of a binder on their surfaces by passing through a mist of binder emulsion ejected from spray nozzle 5, and accumulate on the moving support conveyer 6 with an apparent specific volume of not less than 80 ml/g, where the accumulated filaments 9 successively undergo the treatment of drying and heat setting by heaters 7. The number 10 designates the product leaving the conveyer 6 after being dried and heat set.

The multifilament 1,2 in the present invention may be produced by any known method, but the aerodynamic melt spinning method is preferred wherein the aerodynamic frictional force of air at high speed is used to draw the extruded as-spun filaments to provide the useful filaments as such. In the case of polyesters, high take-up speed of the as-spun filament affords useful filaments without the additional drawing operation usually adopted in the art, and is, therefore, quite suitable for the preparation of a multifilament used in the present invention.

Weak crimp, which is desirable in the present invention, can easily be put in if the temperature of the filaments impinging against the plate 4 is controlled so as to be in a range greater than the glass transition temperature of the polymer concerned, but not in a range greater than 50° C. above the glass transition temperature.

The shape of the nozzle 3 from which the multifilament 2 gushes out with a high speed gaseous fluid (not shown) such as air may be of any form, such as circle, square or slit. The multifilament 1 fed to the nozzle 3 may be a drawn multifilament separately prepared beforehand, but the incorporation of the nozzle 3 in the spinning line of the aerodynamic melt spinning is preferable.

The plate 4 against which the multifilament, gushing out from nozzle 3 with a high speed gaseous fluid, impinges may be a simple plate, and the angle between the plate and the impinging multifilament is determined by the extent of the crimp and the separation of the filaments. The angle usually lies in the range of 45° to 90°. The optimum angle may be readily determined by preliminary tests, if necessary. A curved surface other than a plate may also be used to provide enhanced control of the multifilament.

The distance between the exit of the nozzle 3 and the point on the surface of the plate 4 where the multifilament impinges may also be selected based on the extent desired for the crimp and the separation of the filaments.

The multifilament 2, after impinging against plate 4, runs on the surface of plate 4 in a relaxed state with the help of the turbulent flows of the accompanying gaseous fluid, and becomes separated into individual single filaments. The separated single filaments 8 undergo the deposition of binder on their surfaces on their way to the moving support conveyer 6, and thereafter, are spread out and accumulated on the moving support to form an accumulation of desired width and weight per unit area.

The deposition of the binder on the filaments before the accumulation is essential for this process because an appropriate amount of binder on the filaments gives the filaments additional weight which contributes to stabilize, at least temporarily, the not yet heat-stabilized accumulation, and also, because the relatively uniform deposition of binder on the filament surface can be attained in an amount desirable for the embodiment of the present invention. An attempt to deposit the binder after the accumulation of the filaments fails to provide the accumulated product of the present invention since it is almost impossible to deposit the binder in an appropriate amount throughout the inner part of the accumulation without losing the apparent specific volume.

The binder may be used either in the liquid state with an appropriate viscosity, or a solution or emulsion of solvent or water and may be selected from the group consisting of polyvinylalcohol, polyvinylpyrrolidone, polyurethane, synthetic latexes, and polyacrylic esters. An additional incorporation into the solution or emulsion of emulsifiers, surfactants, antistatic agents, antioxidants, and coloring agents can be adopted if desired.

Figure 2:
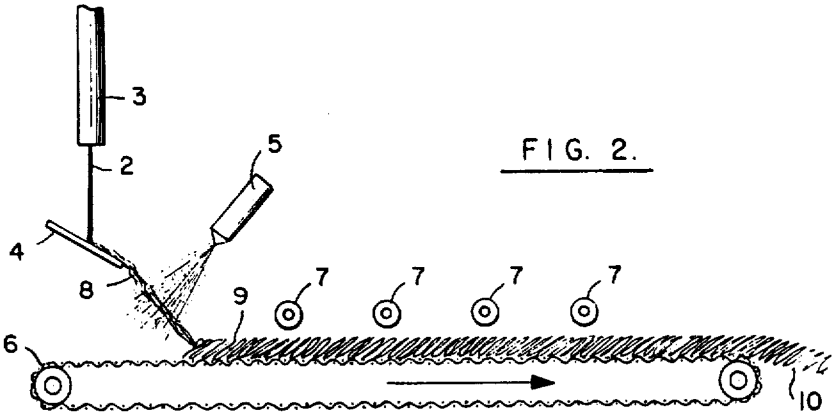
FIG. 2 is a side elevational view of FIG. 1 illustrating the accumulated filaments being repeatedly folded.

After deposition of the binder on the filaments, the filaments are spread out and accumulated on the moving support so that a layered accumulation of the filaments is established. The extent of the spreading out can be determined by the relationship between the impinging velocity of the filaments and the moving speed of the collecting conveyer surface. Usually the former speed is considerably higher than the latter so that folding of the filaments at both surfaces of the accumulated product, as shown in FIG. 2 of the drawings, may be attained.

If the width of the spreading out of the filaments is smaller than the desired width of the accumulated product, periodical alteration of the point where the impinging filaments lie on the surface of the conveyer can be successfully carried out. The provision of another spinning head may be the next alternative in bringing about the accumulation of the desired width. The second facility for spraying the binder on the surface in order to provide the accumulation of the enriched surface with the binder may be separately added to the later section.

It is important to lay the filaments so as to form a bulky accumulation whose apparent specific volume is not less than about 80 ml/g, and to secure the final heat-set bulkiness of more than about 40 ml/g. Accordingly, suction by vacuum from the underside of the support conveyer should not be used in this case because suction can cause a considerable and undesirable reduction in the apparent specific volume.

The accumulated product thus obtained is then transferred to a drier to eliminate the solvent or water if they have been used in the previous step. In this case, unnecessary strong blowing of hot air is not recommended because of the resulting significant loss in bulkiness.

Heating by infrared rays is more desirable for purposes of the present invention. Next, the dried accumulated product should undergo heat-setting at a temperature sufficiently high to stabilize the bulkiness of the accumulated product. The accumulated product made up of polyethylene terephthalate, for example, can be heat-set at about 160° C. for five minutes to stabilize the crimp and binding at the cross-over points. Moreover, polyvinylalcohol, when used as a binder, becomes insoluble in water by thermal treatment at a high temperature of about 200° C., which is a desirable phenomenon for later use.

The above-mentioned two steps, e.g. drying and heat-setting, should be performed soon after the spread out accumulation of filaments has occured. Of course, the drying step can be discarded when neither solvent nor water has been used before hand.

Thus, the bulky material obtained according to the present invention is a multi-layered structure of a spread of single filaments whose cross-over points have been partly united by a binder and heat-set to stabilize the bulky form. The fact that a partial and appropriate number of cross-over points of the single filaments has been united and heat stabilized contributes to the embodiment of a bulky material which can be easily deformed by a minute compression or shearing force, but at the same time, store the elastic energy necessary to recover its original bulky state. Therefore, high bulkiness and high drapability can coexist in the accumulation of the present invention.

The weak crimp in the filaments also contributes to enrich the above-mentioned effect, and coexistence of lubricant with the binder on the surface of the filaments is also desirable to improve the resiliencce of the accumulated bulky product. The preferred amount of lubricants used may be from about 0.01 to about 0.5% by weight of the filaments. Lubricants containing polyorganosiloxane are especially preferred.

The bulky materials thus obtained according to the present invention can be used in comforters, duvets, jackets, and the like, and exhibit superior thermal insulation properties which are as good as those of conventional downs and feathers.

The following examples are illustrative only and should not be construed to limit the scope of the invention as defined in the appended claims.

EXAMPLE 1

From a melt spinning spinneret with 80 holes, each being 0.20 millimeters in diameter, polyethylene terephthalate, with an intrinsic viscosity of 0.65 measured in o-chlorophenol at 30° C. was melt spun at 290° C. into a chamber having an inner pressure set at 2.3 kg/cm$^2$ by feeding compressed air. The extruded multifilament entered the nozzle, having an inner diameter and length of 4 mm and 60 mm, respectively, at 50 cm below the spinneret, and went through the nozzle with air whose velocity reached sonic velocity at the exit of the nozzle. The multifilaments gushed from the nozzle at about 6000 meters per minute with the help of the aerofrictional force of the coexisting air of sonic velocity. The multifilament thus obtained comprised 80 filaments, each filament having a fineness of about 0.8 denier.

At 7 mm below the exit of the nozzle, the multifilament impinged against the plate whose direction in relation to that of the impinging multifilament was 60°, and then ran for 30 cm along the surface of the plate. During the above process, weak crimping and separation of the multifilament into individual single relaxed filaments was accomplished. The single filaments 8 then left the plate and were sprayed with the binder. Thereafter, the filaments spread out and laid down on the conveyer whose surface velocity was 0.3 meters per minute. The binder consisted of 100 parts by weight of polyvinylalcohol having a molecular weight of about 500 and an extent of saponification greater than about 99%, and one part by weight of a lubricant composition comprising stearic acid ester and dodecylbenzene sodium sulfonic acid in the ratio of 7:3, respectively. The binder was sprayed onto the single filaments in an emulsified state of 4% water so that the final deposition was 5% by weight of the filament.

When the single filaments were spread out and laid on the conveyer, the reaching point of the filaments was reciprocated twice per minute resulting in the formation of a 1.5 meter width of the accumulated product. The resultant accumulation was 20 cm in thickness and 400 ml/g in apparent specific volume.

The wet product was then carried for 18 minutes through the drier and heat setter in which infrared rays were driven by 12 Kilowatts of electricity. The temperature of the accumulation at the exit of the heat setter was about 160° C. The final accumulation of the filaments thus obtained had a stable bulkiness of 104 ml/g and 200 g/m$^2$, and exhibited an excellent drapability in spite of its bulk.

A comforter in which the bulky material of the present invention was used exhibited good drapability and excellent thermal insulation during long use. The apparent specific volume of the accumulation in the comforter was about 190 ml/g.

COMPARATIVE EXAMPLE 1

In Example 1, the amount of deposition of the binder was reduced to 0.1% by weight of the filaments, and everything else remained the same. The resultant accumulation of the filaments took a desirable bulky form, but the bulkiness decreased swiftly when used in a comforter. This swift decrease in bulkiness was considered to be caused by the scant number of cross-over points united by the binder, and by poor resiliency for the same reason.

COMPARATIVE EXAMPLE 2

In Example 1, the amount of the deposition of the binder on the filament was increased to 25% by weight of the filaments. The resultant accumulation lost the drapability intended by the invention.

EXAMPLE II

The accumulation of the filaments obtained in Example 1 was further treated on its surface with additional polyvinylalcohol, depositing an additional 5% by weight of filaments on the surface. The resultant accumulation took a more stable shape and was easy to cut or to sew in quilting.

EXAMPLE III

The potential of thermal insulation was compared with conventional materials for the same use. As indicated in Table 1, the bulky material according to the present invention has about twice the thermal insulating ability of cotton, and is comparable to down.

TABLE 1

| Item | Index* of Thermal Insulation |
|---|---|
| Bulky material of the present invention | 2.2 |
| Down | 2.2 |
| Silk | 1.6 |
| Polyester staple fiber | 1.5 |
| Cotton | 1.0 |

*The clo-value for thermal insulation, measured under the samesample weight per unit area and load, is non-dimensioned by taking the value of cotton as standard.

Clo-value is a physical number to designate the potential of thermal insulation, and is defined as follows:

One clo is a unit of the potential of thermal insulation defined in such a way that a man who, lying at rest and discharging heat of 50 kcal/m$^2$/hour, feels comfortable with his skin at a temperature of 33° C. under external environmental conditions of 21.2° C., less than 50% relative humidity, and an air flow of 10 cm/sec.

We claim:

1. A process for producing a thermal insulating non-woven bulky product the steps which comprise
   (a) spinning the filaments of a synthetic polymer under fluid pressure,
   (b) releasing the spun filaments together with fluid at high velocity for crimping and separating,
   (c) crimping and separating the filaments,
   (d) spraying the crimped and separated filaments with a binder,
   (e) spreading out and accumulating the separated filaments into layers, and
   (f) heating the layered filaments to the final product.

2. The process of claim 1 including drying of the filaments prior to step (f).

3. The process of claim 1 including folding the filaments directly after step (e).

4. The process of claim 1 wherein the filaments of step (a) are multifilament and the fluid is air.

5. The process of claim 1 in which step (a) is carried out by melt-spinning.

* * * * *